US012156279B1

(12) United States Patent
Rahman

(10) Patent No.: US 12,156,279 B1
(45) Date of Patent: Nov. 26, 2024

(54) CHANNEL QUALITY INDICATION IN SESSION INITIATION PROTOCOL SIGNALING

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 167 days.

(21) Appl. No.: 17/473,851

(22) Filed: Sep. 13, 2021

(51) Int. Cl.
H04W 76/30 (2018.01)
H04L 65/1104 (2022.01)
H04W 24/08 (2009.01)
H04L 45/74 (2022.01)

(52) U.S. Cl.
CPC ......... *H04W 76/30* (2018.02); *H04L 65/1104* (2022.05); *H04W 24/08* (2013.01); *H04L 45/74* (2013.01)

(58) Field of Classification Search
CPC ... H04W 76/30; H04W 24/08; H04L 65/1104; H04L 45/74
See application file for complete search history.

(56) References Cited

U.S. PATENT DOCUMENTS

| | | | |
|---|---|---|---|
| 6,434,143 B1 | 8/2002 | Donovan | |
| 6,615,236 B2 | 9/2003 | Donovan et al. | |
| 6,694,145 B2 | 2/2004 | Riikonen et al. | |
| 6,757,732 B1 | 6/2004 | Sollee et al. | |
| 6,788,676 B2 | 9/2004 | Partanen et al. | |
| 6,870,848 B1 | 3/2005 | Prokop | |
| 6,904,140 B2 | 6/2005 | Trossen | |
| 6,934,279 B1 | 8/2005 | Sollee et al. | |
| 6,963,635 B1 | 11/2005 | Jones | |
| 6,970,909 B2 | 11/2005 | Schulzrinne | |
| 6,970,930 B1 | 11/2005 | Donovan | |
| 7,020,130 B2 | 3/2006 | Krause et al. | |
| 7,020,707 B2 | 3/2006 | Sternagle | |
| 7,031,280 B2 | 4/2006 | Segal | |
| 7,035,248 B2 | 4/2006 | Wengrovitz | |
| 7,042,871 B2 | 5/2006 | Gallant et al. | |
| 7,089,027 B1 | 8/2006 | Welch et al. | |
| 7,092,385 B2 | 8/2006 | Gallant et al. | |
| 7,103,067 B1 | 9/2006 | Singh et al. | |

(Continued)

FOREIGN PATENT DOCUMENTS

EP    1460799 A1 * 9/2004 ............. H04L 29/06

*Primary Examiner* — Peter P Chau
(74) *Attorney, Agent, or Firm* — Perkins Coie LLP

(57) ABSTRACT

Methods, devices, and system related to identifying the causes for call drops or call session failures are disclosed. In particular, Radio Frequency (RF) measurements can be included in Session Initiation Protocol (SIP) messages to enable further analysis of the failures. In one example aspect, a method for wireless communication includes determining, by a user device, one or more indicators indicating a channel condition or a signal condition for performing wireless communications. The method also includes transmitting, by the user device, a Session Initiation Protocol (SIP) message to an SIP server indicating a termination of a communication session. The SIP message includes the one or more indicators to enable to SIP server to determine a cause for the termination of the communication session.

17 Claims, 5 Drawing Sheets

(56) References Cited

U.S. PATENT DOCUMENTS

| | | | |
|---|---|---|---|
| 7,126,939 | B2 | 10/2006 | Barany et al. |
| 2002/0191593 | A1 | 12/2002 | Oneill et al. |
| 2003/0174693 | A1 | 9/2003 | Gallant et al. |
| 2003/0236892 | A1 | 12/2003 | Coulombe |
| 2004/0071090 | A1 | 4/2004 | Corson et al. |
| 2004/0072593 | A1 | 4/2004 | Robbins et al. |
| 2004/0107238 | A1 | 6/2004 | Orton et al. |
| 2004/0119814 | A1 | 6/2004 | Clisham et al. |
| 2004/0196821 | A1 | 10/2004 | Haddad et al. |
| 2004/0249951 | A1 | 12/2004 | Grabelsky et al. |
| 2005/0132075 | A1 | 6/2005 | Creamer et al. |
| 2005/0135386 | A1 | 6/2005 | Shores et al. |
| 2005/0154793 | A1 | 7/2005 | Khartabil |
| 2005/0169223 | A1 | 8/2005 | Crocker et al. |
| 2005/0213509 | A1 | 9/2005 | Collomb et al. |
| 2005/0232222 | A1 | 10/2005 | Mcconnell et al. |
| 2006/0045043 | A1 | 3/2006 | Crocker et al. |
| 2006/0085545 | A1 | 4/2006 | Borella et al. |
| 2006/0098624 | A1 | 5/2006 | Morgan et al. |
| 2006/0101098 | A1 | 5/2006 | Morgan et al. |
| 2006/0172753 | A1 | 8/2006 | Sung et al. |
| 2006/0209775 | A1 | 9/2006 | Lim et al. |
| 2007/0076696 | A1* | 4/2007 | An .................... H04W 36/0058 370/352 |
| 2007/0280453 | A1* | 12/2007 | Kelley .................. H04L 67/147 379/201.01 |
| 2008/0112549 | A1* | 5/2008 | Yoon ................. H04M 15/8016 379/114.06 |
| 2015/0350974 | A1* | 12/2015 | Patil ................ H04W 36/00835 370/331 |
| 2020/0204676 | A1* | 6/2020 | Chiang ............... H04M 3/2227 |

\* cited by examiner

CHANNEL QUALITY INDICATION IN SESSION INITIATION PROTOCOL SIGNALING

BACKGROUND

Historically, mobile phones have provided voice call services to user over a circuit-switched-style network, such as the public switched telephone network (PSTN). With the development of wireless communication technology, Internet Protocol (IP) IP packet-switched networks are handling more and more of the communication services. To enable delivery of IP multimedia services, the IP Multimedia Subsystem or IP Multimedia Core Network Subsystem (IMS) has been introduced as an architectural framework.

BRIEF DESCRIPTION OF THE DRAWINGS

Detailed descriptions of implementations of the present invention will be described and explained through the use of the accompanying drawings.

Figure 1:
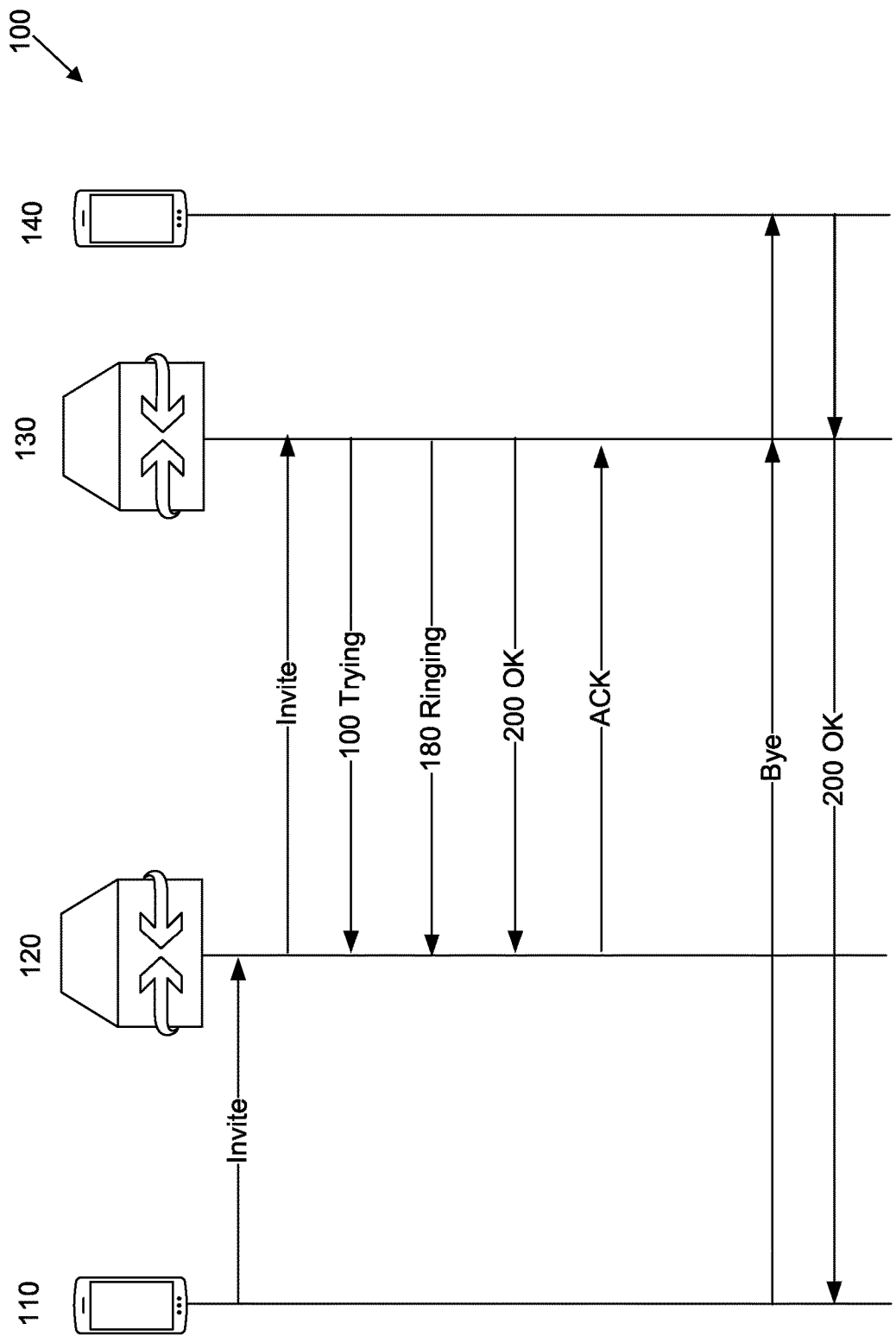
FIG. 1 illustrates an example architecture of the Internet Protocol (IP) Multimedia Subsystem.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In wireless networks, various issues can lead to dropped calls, communication session interruptions, or failure to establish communication sessions. Many of these issues are often caused by poor channel conditions and/or poor Radio Frequency (RF) signal strength and quality. However, currently it is difficult to identify causes for the communication session failures based on call trace of the signaling messages because the signaling messages do not carry any information about the RF signal or channel conditions. Network carriers may spend a great amount of time trying to correlate the failure messages with underlying channel or RF conditions without much success.

This patent document discloses techniques that can be implemented in various embodiments to facilitate the diagnosis of dropped calls, session setup failures, and other types of issues in the communication networks. In particular, information about channel conditions and/or RF measurements can be included in session signaling messages when sessions terminate. Such information can be stored by the network nodes to allow subsequent analysis of failed communication channels (e.g., by the carrier), to determine the corresponding causes and to adjust the network deployment if necessary.

User Equipment (UE) Measurement Report

Channel State Information (CSI) is an indicator of the channel condition for wireless communications. The UEs can be configured to periodically or aperiodically measure different types of quantities, such as Reference Signal Received Power (RSRP), Received Signal Strength Indicator (RSSI), Reference Signal Received Quality (RSRQ), Signal to Noise Ratio (SINR), and/or Channel Quality Indicator (CQI). The RSRP is linear average of reference signal power across the specified bandwidth. The RSSI is the total power UE observes across the whole band, which includes the main signal and co-channel non-serving cell signal, adjacent channel interference and even the thermal noise within the specified band. The RSRQ is defined as the ratio between RSRP and RSSI. The CQI indicates the highest modulation and the code rate at which the block error rate (BLER) of the channel being analyzed does not exceed a predefined threshold. These indicators are measured and determined by the broadband modem of the UE, and are reported to the base station or the serving cell. However, these measurement results, especially the measurements collected at the physical layer by the broadband modem, are typically not included in the communication session signaling protocol in the session layer that is designed to be independent of the underlying layer(s).

Session Initiation Protocol (SIP)

The IMS core uses the Session Initiation Protocol (SIP), a signaling protocol, to initiate, maintain, and terminate real-time sessions that include voice, video and messaging applications. The SIP is used for signaling and controlling multimedia communication sessions in applications of Internet telephony for voice and video calls, in private IP telephone systems, in instant messaging over Internet Protocol (IP) networks as well as voice calling over Long-Term Evolution (VoLTE) or New Radio (VoNR).

FIG. 1 illustrates an example SIP call flow 100 between two SIP proxy servers that handle a voice call. The proxy server 120 receives an INVITE message from a user device 110 that wants to initiate a call to another user device 140. The proxy server 120 forwards the SIP INVITE message to a second proxy server 130.

When a call setup failure happens (e.g., the session fails to be established properly, or the call setup takes too long), an SIP CANCEL request can be transmitted to terminate such a session. When a success response (e.g., 200 OK) or an ACK has been sent when the INVITE message has received, the session is considered established. A successful INVITE request establishes a dialog between the two user agents (e.g., 110, 140) which continues until a BYE is sent to terminate the session. When either the caller or the callee wants to end the session, an SIP BYE message can be sent to terminate the established session. For a dropped call (e.g., caused by poor signal strength), the BYE message can also be sent to terminate the session. In some cases, the BYE request can be routed end to end, bypassing the proxy server.

While SIP is involved in the signaling operations of a media communication session (e.g., voice or video call and/or multimedia messages), the SIP signaling messages do not carry any indicators of the RF signal strength and/or quality. Therefore, no RF information is conveyed to the SIP servers when a failure occurs. Given a set of failed SIP requests for various dropped calls and/or session failures, it is thus difficult for the network carrier to determine the cause of these failures. To address this problem, additional measurement information can be included in SIP signaling when a session terminates (normally or abnormally), thereby facilitating the diagnosis of call drop/termination issues.

Figure 2A:
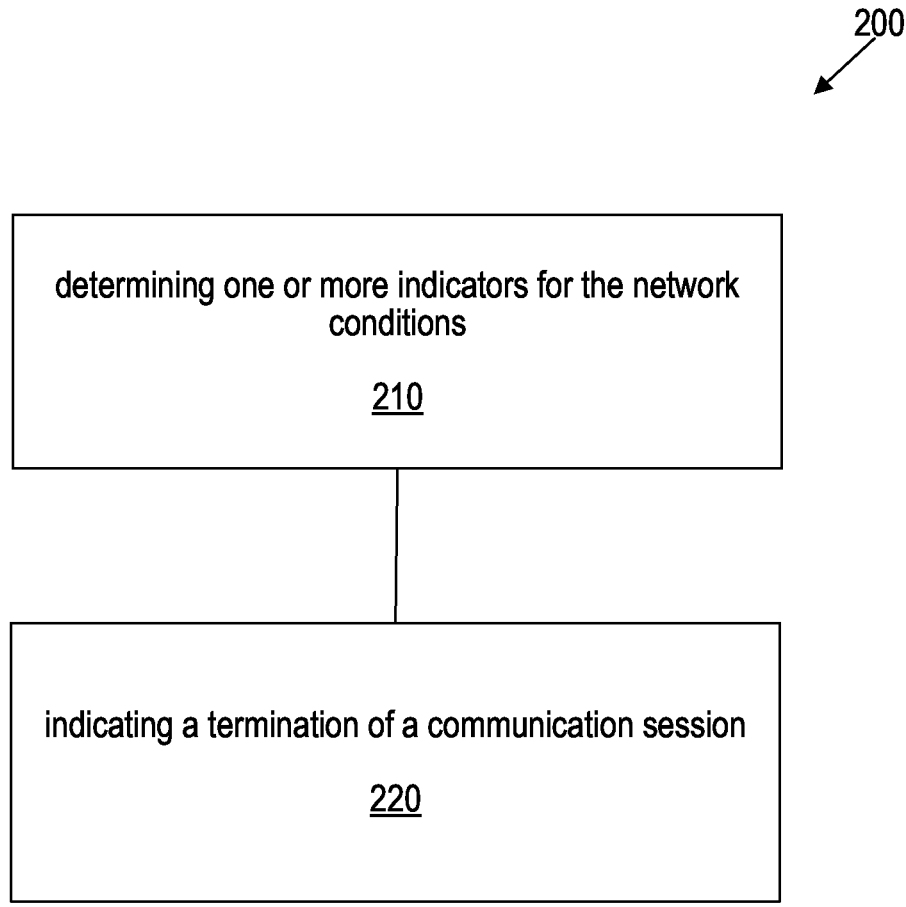
FIG. 2A is a flow chart representation of a method for wireless communication in accordance with one or more embodiments of the present technology.

FIG. 2A is a flowchart representation of a method 200 for wireless communication in accordance with one or more embodiments of the present technology. The method 200 includes, at operation 210, determining, by a user device, one or more indicators indicating a channel condition or a signal condition for performing wireless communications. The method 200 includes, at operation 220, transmitting, by the user device, a Session Initiation Protocol (SIP) message to an SIP server indicating a termination of a communication session. The SIP message includes the one or more indicators to enable to SIP server to determine a cause for the termination of the communication session.

In some embodiments, the user device can perform the transmission upon determining that the channel condition or the signal condition has deteriorated. For example, the user device can terminate an established session when it detects that the channel condition and/or RF signal is getting worse (e.g., during a handover/mobility event). Alternatively, or in addition, the user device can receive a notification from the SIP server notifying the termination of the communication session, which triggers the transmission of the SIP message.

The one or more indicators can include at least one of Reference Signal Received Power (RSRP), Reference Signal Received Quality (RSRQ), Received Signal Strength Indicator (RSSI), Signal to Noise Ratio (SINR), Channel Quality Indicator (CQI), or Precoding Matrix Indicator (PMI). The SIP message transmitted by the user device can be at least one of a SIP BYE message, a SIP CANCEL message, a SIP 200 OK message, or a SIP 4XX message. The SIP message can have a header field that includes the one or more indicators. In some embodiments, the SIP message includes one or more status code that correspond to the one or more indicators. Details about including the one or more indicators in the SIP message are further discussed in the example Embodiments 1 to 3 below.

Figure 2B:
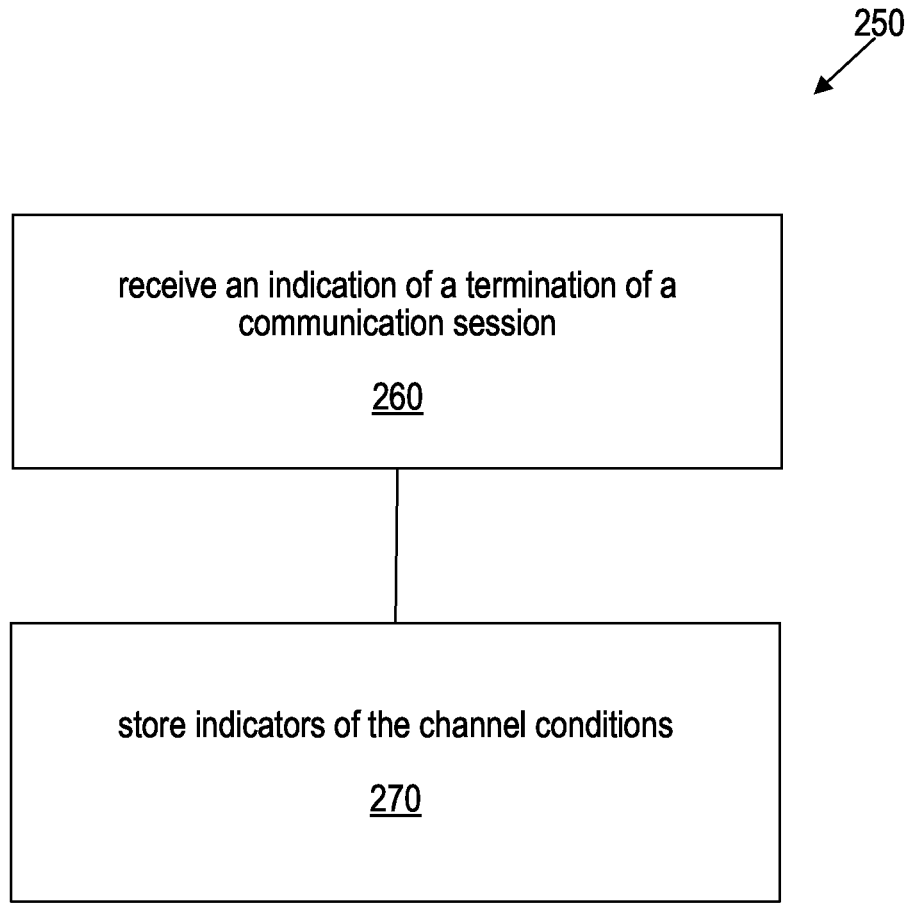
FIG. 2B is a flow chart representation of another method for wireless communication in accordance with one or more embodiments of the present technology.

FIG. 2B is a flowchart representation of a method 250 for wireless communication in accordance with one or more embodiments of the present technology. The method 250 includes, at operation 260, receiving, by a Session Initiation Protocol (SIP) server, an SIP message from a user device indicating a termination of a communication session. The SIP message includes the one or more indicators indicating a channel condition or a signal condition for the user device to perform wireless communications. The method 250 includes, at operation 270, storing the one or more indicators (e.g., adding the one or more indicators indicating the channel condition or the signal condition to a Call Detail Record, CDR). The CDR can be stored and used for subsequent analysis of the communication session. For example, the stored records can be examined so as to allow the correlation between the session failures and the corresponding channel conditions and/or RF signal strengths. Determinations then can be made regarding whether any changes to the system deployment are needed, such as deploying more cells or base stations, or changing the carrier configurations of existing cells.

In some embodiments, the SIP server transmits a notification to the user device notifying the termination of the communication session prior to receiving the SIP message. The one or more indicators comprise at least one of Reference Signal Received Power (RSRP), Reference Signal Received Quality (RSRQ), Received Signal Strength Indicator (RSSI), Signal to Noise Ratio (SINR), Channel Quality Indicator (CQI), or Precoding Matrix Indicator (PMI). The SIP message can be at least one of an SIP BYE message, an SIP CANCEL message, an SIP 200 OK message, or an SIP 4XX message. The SIP message can have a header field that includes the one or more indicators. In some embodiments, the SIP message includes one or more status code that correspond to the one or more indicators. Details about including the one or more indicators in the SIP message are further discussed in the example Embodiments 1 to 3 below.

Some examples of the disclosed techniques are further described in the following example embodiment.

Embodiment 1

This embodiment discloses techniques that use an existing SIP header to carry the UE measurement results, such as RSRP, RSRQ, RSSI, etc.

According to the SIP standard, in particular RFC 3326, the SIP BYE message and CANCEL message include a Reason header field that can be used to indicate the UE measurements. The Reason header field can also appear in any request within a dialog, and in any response whose status code explicitly allows the presence of this header field.

For example, when a caller/callee terminates an established session, the caller/callee can add measurement results in the SIP BYE message that it transmits to the SIP proxy server or the other party. An example Reason header field that encapsulates the RF measurement results is shown below.

BYE sip: 1234@example.com SIP/2.0
Call-ID: UniqueID@example.com
To: Alice@example.com
From: Bob@example.com
. . .
Reason: token; reason-extension="RSRP=−60 dbm";

Here, the RSRP has a value of −60 dbm, indicating that the quality of the received signal is good. The SIP proxy server can choose to discard the RSRP value or to save it for further statistical analysis of the network conditions.

In some cases, the RF signal strength or quality deteriorates, leading to the caller/callee to send an SIP CANCEL message.

CANCEL sip: 1234@example.com SIP/2.0
Call-ID: UniqueID@example.com
To: Alice@example.com
From: Bob@example.com
. . .
Reason: token; reason-extension="RSRQ=−18 dB";

The SIP CANCEL message from the caller/callee device carries the RSRQ value to the SIP proxy server, thereby enabling the SIP proxy server to determine that cause of the termination of the session.

In some embodiments, the SIP proxy sever forwards an INVITE message from the a user device and then send a CANCEL message, terminating the session. In response to the CANCEL message, the user device can send a 4XX message (e.g., a 487 Request Terminated message) with the measured RSSI value of −100, indicating poor signal strength.

SIP/2.0 487 Request Terminated
Call-ID: UniqueID@example.com
To: Alice@example.com
From: Bob@example.com
. . .
Reason: token; reason-extension="RSSI=−100";

Embodiment 2

This embodiment discloses techniques that use carrier-specific status code(s) to carry the UE measurement results, such as RSRP, RSRQ, RSSI, etc.

In some cases, the SIP proxy determines to terminate an established session, and the user device receives an SIP BYE message from the IMS network. In response to the SIP BYE message, the user device sends a "200 OK" message to indicate that the action (e.g., terminating the session) was successfully received, understood, and accepted. However, the "200 OK" message does not include the Reason header field to indicate the appropriate measurement results.

The 200 status code corresponds to the status phrase of "OK." Different status codes can be used in the 2XX messages to carry different status phrases, thereby conveying different types of information. For example, carrier-specific mapping between the 2XX status codes and the corresponding indicators can be configured. Table 1 shows an example mapping of the CSI indicators and the status codes.

TABLE 1

Example Mapping of CSI Indicators and 2XX Status Codes

| CSI Indicator | 2XX Status Code |
|---|---|
| RSRP | 271 |
| RSRQ | 272 |
| RSSI | 273 |
| SINR | 274 |
| CQI | 275 |

The user devices that are serviced by the carrier can be configured with the mapping. For example, the user devices can be provisioned by the carrier during device registrations. Alternatively, or in addition, the mapping can be configured periodically by the carrier, e.g., via system upgrades. Upon receiving an SIP BYE message, the user device can include the carrier-specific status code, along with the corresponding value as the status phrase in the 2XX message. An example 2XX message from the userdevice is shown below:

Sip/2.0 275 "25"

Call-ID: UniqueID@example.com

To: Alice@example.com

From: Bob@example.com

. . .

In this message shown above, a status code of 275 corresponds to CQI, and the status phrase indicates that the CQI value is 25, suggesting a bad channel quality. If the SIP server is configured with the mapping, the SIP server is then able to recognize the CQI value and store it for future analysis. If the SIP server is not configured with the mapping between the carrier-specific 2XX status code and the CSI indicators, the status code is treated as the default value of 200.

Sip/2.0 27X "XX"

Call-ID: UniqueID@example.com

To: Alice@example.com

From: Bob@example.com

. . .

Another example 2XX message from the user device is shown below:

Sip/2.0 274 "15"

Call-ID: UniqueID@example.com

To: Alice@example.com

. . .

From: Bob@example.com

In this example, the 2XX message carries a status code of 274, corresponding to the SINR indicator. The status phrase indicates that the SINR value is 15 dB, suggesting strong signal with good data speeds. Therefore, the communication interruption is most likely caused by reasons other than poor signal strength/channel condition.

Embodiment 3

This embodiment discloses techniques that use a SIP header to carry the UE measurement results, such as RSRP, RSRQ, RSSI, etc.

Instead of using the Reason header field, which is not included in messages such as "200 OK," a new header field that can be present in all requests and responses of the SIP signaling. An example definition of the header field is shown below:

| Header | Where | Proxy | ACK | BYE | CAN | INV | OPT | REG |
|---|---|---|---|---|---|---|---|---|
| Channel-State | | | — | m* | m* | — | o | — |

In this example, the "where" column is empty, indicating that the header field "Channel-State" can be present in all requests and responses. The proxy column is also empty, meaning that a proxy is not mandated to read the header field. This ensures backward compatibility with the existing systems. The remaining columns indicate whether the header field in present in different types of message: ACK, BYE, CAN referring to CANCEL, INV referring to INVITE, OPT referring to OPTIONS, and REG referring to REGISTER. For example, the value "m*" indicates that the header field SHOULD be sent, but clients/servers need to be prepared to receive messages without that header field. Other values, such as "c" (conditional), "m" (mandatory", and/or "o" (optional), can also be used in the definition of this new header field.

Once the SIP proxy servers receive the channel condition/ RF signal indicators carried in the SIP signaling messages, the SIP proxy servers can store the data for future analysis. In some embodiments, the SIP proxy servers can incorporate the measurement results carried in the SIP messages into Call Detail Records (CDR). A CDR is a data record produced by telecommunications equipment that documents the details of a call or other telecommunications transaction (e.g., text message) that passes through that facility or device. For service providers or carriers, incorporating the measurement results into the CDR can allow the carriers to determine the network conditions and/or RF signal conditions for a large number of calls over a period of time, and further facilitate the adjustment or improvement of the network to provide users with better communication experiences.

Wireless Communications System

Figure 3:
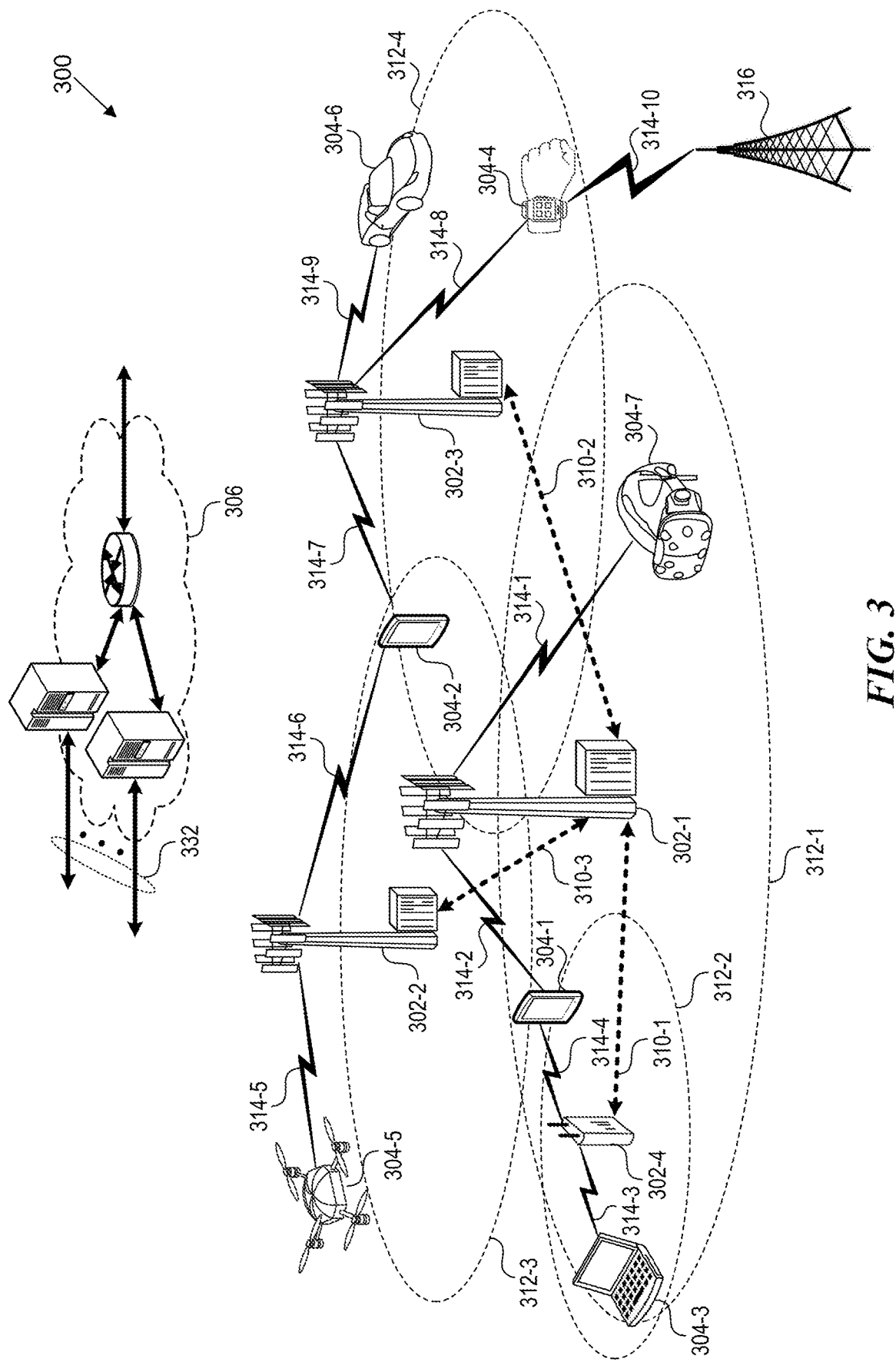
FIG. 3 is a block diagram that illustrates a wireless communications system.

FIG. 3 is a block diagram that illustrates a wireless telecommunication system 300 ("system 300") in which aspects of the disclosed technology are incorporated. The system 300 includes base stations 302-1 through 302-4 (also referred to individually as "base station 302" or collectively as "base stations 302"). A base station is a type of network access node (NAN) that can also be referred to as a cell site, a base transceiver station, or a radio base station. The system 300 can include any combination of NANs including an access point, radio transceiver, gNodeB (gNB), NodeB, eNodeB (eNB), Home NodeB or eNodeB, or the like. In addition to being a WWAN base station, a NAN can be a WLAN access point, such as an Institute of Electrical and Electronics Engineers (IEEE) 802.11 access point.

The NANs of a network formed by the system 300 also include wireless devices 304-1 through 304-8 (referred to individually as "wireless device 304" or collectively as "wireless devices 304") and a core network 306. The wireless devices are also referred to as UEs, user devices, user agents, or mobile devices. The wireless devices 304-1 through 304-8 can correspond to or include network entities capable of communication using various connectivity standards. For example, a 5G communication channel can use millimeter wave (mmW) access frequencies of 28 GHz or more. In some implementations, the wireless device 304 can operatively couple to a base station 302 over a Long-Term Evolution (LTE)/LTE Advanced (LTE-A) communication channel, which is referred to as a 4G communication channel. In some implementations, the base station 302 can provide network access to a Fifth-Generation (5G) communication channel.

The core network 306 provides, manages, and controls security services, user authentication, access authorization, tracking, Internet Protocol (IP) connectivity, and other access, routing, or mobility functions. The base stations 302 interface with the core network 306 through a first set of backhaul links 308 (e.g., S1 interfaces) and can perform radio configuration and scheduling for communication with the wireless devices 304 or can operate under the control of a base station controller (not shown). In some examples, the base stations 302 can communicate, either directly or indirectly (e.g., through the core network 306), with each other over a second set of backhaul links 310-1 through 310-3 (e.g., X1 interfaces), which can be wired or wireless communication links.

The base stations 302 can wirelessly communicate with the wireless devices 304 via one or more base station antennas. The cell sites can provide communication coverage for geographic coverage areas 312-1 through 312-4 (also referred to individually as "coverage area 312" or collectively as "coverage areas 312"). The geographic coverage area 312 for a base station 302 can be divided into sectors making up only a portion of the coverage area (not shown). The system 300 can include base stations of different types (e.g., macro and/or small cell base stations). In some implementations, there can be overlapping geographic coverage areas 312 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC)), etc.

The system 300 can include a 5G network and/or an LTE/LTE-A or other network. In an LTE/LTE-A network, the term eNB is used to describe the base stations 302 and in 5G new radio (NR) networks, the term gNBs is used to describe the base stations 302 that can include mmW communications. The system 300 can thus form a heterogeneous network in which different types of base stations provide coverage for various geographical regions. For example, each base station 302 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices with service subscriptions with a wireless network service provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively smaller geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 304 and the base stations 302 or core network 306 supporting radio bearers for the user plane data. At the Physical (PHY) layer, the transport channels are mapped to physical channels.

As illustrated, the wireless devices 304 are distributed throughout the system 300, where each wireless device 304 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 304-1 and 304-2), a tablet computer, a laptop computer (e.g., wireless device 304-3), a wearable (e.g., wireless device 304-4). A wireless device can be included in another device such as, for example, a drone (e.g., wireless device 304-5), a vehicle (e.g., wireless device 304-6), an augmented reality/virtual reality (ARNR) device such as a head-mounted display device (e.g., wireless device 304-7), an IoT device such as an appliance in a home (e.g., wireless device 304-8), a portable gaming console, or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 314-1 through 314-11 (also referred to individually as "communication link 314" or collectively as "communication links 314") shown in system 300 include uplink (UL) transmissions from a wireless device 304 to a base station 302, and/or downlink (DL) transmissions, from a base station 302 to a wireless device 304. The downlink transmissions can also be called forward link transmissions while the uplink transmissions can also be called reverse link transmissions. Each communication link 314 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 314 can transmit bidirectional communications using FDD (e.g., using paired spectrum resources) or TDD operation (e.g., using unpaired spectrum resources). In some implementations, the communication links 314 include LTE and/or mmW communication links.

In some implementations of the system 300, the base stations 302 and/or the wireless devices 304 include multiple antennas for employing antenna diversity schemes to improve communication quality and reliability between base stations 302 and wireless devices 304. Additionally, or alternatively, the base stations 302 and/or the wireless devices 304 can employ multiple-input, multiple-output (MIMO) techniques that can take advantage of multi-path environments to transmit multiple spatial layers carrying the same or different coded data.

Computer System

Figure 4:
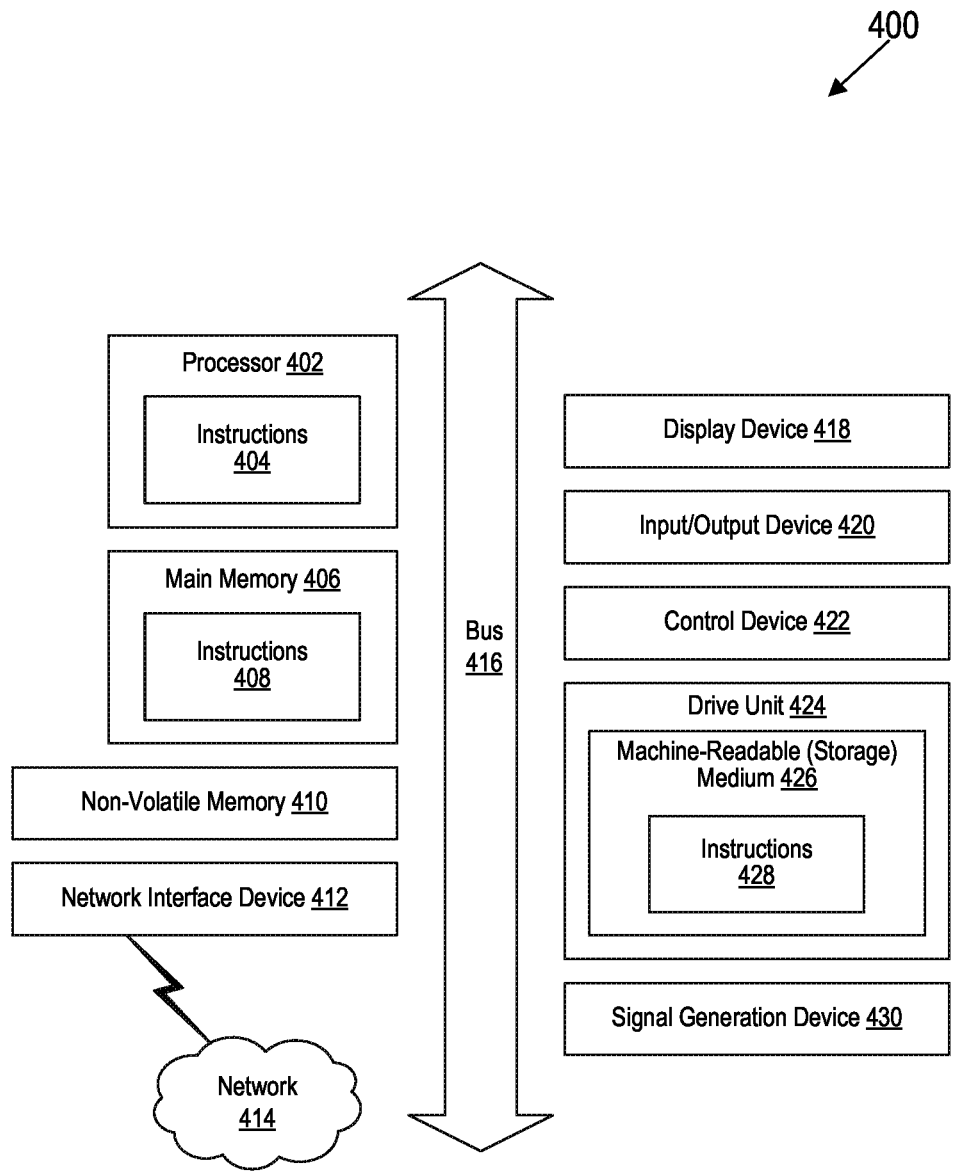
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 930 that are communicatively connected to a bus 416. The bus 416 represents one or more physical buses and/or point-to-point connections that are connected by appropriate bridges, adapters, or controllers. Various common components (e.g., cache memory) are omitted for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

What is claimed is:

1. A method for wireless communication, comprising:
   determining, by a user device, one or more indicators indicating a channel condition or a signal condition for performing wireless communications, transmitting, by the user device, a Session Initiation Protocol (SIP) message to a SIP server indicating a termination of a communication session, wherein the SIP message includes a field associated with the one or more indicators indicating a cause for the termination of the communication session by a deterioration of the channel condition or the signal condition,
   wherein the field comprises one or more status codes that correspond to the one or more indicators,
   wherein the method further comprises:
   receivinq, by the user device, a configuration that comprises a mapping between the one or more status codes and the one or more indicators.

2. The method of claim 1, further comprising:
   receiving, by the user device prior to transmitting the SIP message, a notification from the SIP server notifying the termination of the communication session.

3. The method of claim 1, wherein the one or more indicators comprise at least one of: Reference Signal Received Power (RSRP), Reference Signal Received Quality (RSRQ), Received Signal Strength Indicator (RSSI), Signal to Noise Ratio (SINR), Channel Quality Indicator (CQI), or Precoding Matrix Indicator (PMI).

4. The method of claim 1, wherein the SIP message comprises at least one of: an SIP BYE message, an SIP CANCEL message, an SIP 200 OK message, or an SIP 4XX message.

5. A device for wireless communication, comprising one or more processors that are configured to:

receive a Session Initiation Protocol (SIP) message from a user device indicating a termination of a communication session,
   wherein the SIP message includes a field associated with one or more indicators indicating a cause for the termination of the communication session by a deterioration of a channel condition or a signal condition,
   wherein the field comprises one or more status codes that correspond to the one or more indicators,
   wherein the one or more indicators indicate the channel condition or the signal condition for the user device to perform wireless communications,
receive a configuration that comprises a mapping between the one or more status codes and the one or more indicators; and
store the one or more indicators indicating the channel condition or the signal condition for subsequent analysis of the communication session.

6. The device of claim 5, wherein the one or more processors are configured to:
   transmit, prior to receiving the SIP message, a notification to the user device notifying the termination of the communication session.

7. The device of claim 5, wherein the one or more indicators comprise at least one of Reference Signal Received Power (RSRP), Reference Signal Received Quality (RSRQ), Received Signal Strength Indicator (RSSI), Signal to Noise Ratio (SINR), Channel Quality Indicator (CQI), or Precoding Matrix Indicator (PMI).

8. The device of claim 5, wherein the SIP message comprises at least one of an SIP BYE message, an SIP CANCEL message, an SIP 200 OK message, or an SIP 4XX message.

9. The device of claim 5, wherein the one or more processors are configured to store the one or more indicators in at least one Call Detail Record (CDR) to enable subsequent analysis of the channel condition or the signal condition for performing wireless communications.

10. A non-transitory computer readable medium having code stored thereon, when executed by at least one processor of a user device, cause the user device to:
   determine one or more indicators indicating a channel condition or a signal condition for performing wireless communications,
   transmit a Session Initiation Protocol (SIP) message to a SIP server indicating a termination of a communication session, wherein the SIP message includes a field associated with the one or more indicators indicating a cause for the termination of the communication session by a deterioration of the channel condition or the signal condition,
   wherein the field comprises one or more status codes that correspond to the one or more indicators,
   wherein the code, when executed by the at least one processor of the user device, causes the user device to:
   receive a configuration that comprises a mapping between the one or more status codes and the one or more indicators.

11. The non-transitory computer readable medium of claim 10, wherein the code, when executed by the at least one processor of the user device, causes the user device to:
   receive, prior to transmitting the SIP message, a notification from the SIP server notifying the termination of the communication session.

12. The non-transitory computer readable medium of claim 10,
   wherein the one or more indicators comprise at least one of: Reference Signal Received Power (RSRP), Reference Signal Received Quality (RSRQ), Received Signal Strength Indicator (RSSI), Signal to Noise Ratio (SINR), Channel Quality Indicator (CQI), or Precoding Matrix Indicator (PMI), and
   wherein the SIP message comprises at least one of: an SIP BYE message, an SIP CANCEL message, an SIP 200 OK message, or an SIP 4XX message.

13. The method of claim 1, wherein the configuration is received by the user device during a device registration process.

14. The method of claim 1, comprising:
   receiving, by the user device, a periodic update to update the mapping between the one or more status codes and the one or more indicators.

15. The non-transitory computer readable medium of claim 10, wherein the configuration is received by the user device during a device registration process.

16. The non-transitory computer readable medium of claim 10, wherein the code, when executed by the at least one processor of the user device, causes the user device to:
   receive a periodic update to update the mapping between the one or more status codes and the one or more indicators.

17. The non-transitory computer readable medium of claim 10, wherein the SIP message comprises at least one of: an SIP BYE message, an SIP CANCEL message, an SIP 200 OK message, or an SIP 4XX message.

* * * * *